Oct. 10, 1961   C. M. L. L. BOURCIER DE CARBON   3,003,594
SHOCK ABSORBERS
Filed Dec. 9, 1957   2 Sheets-Sheet 1
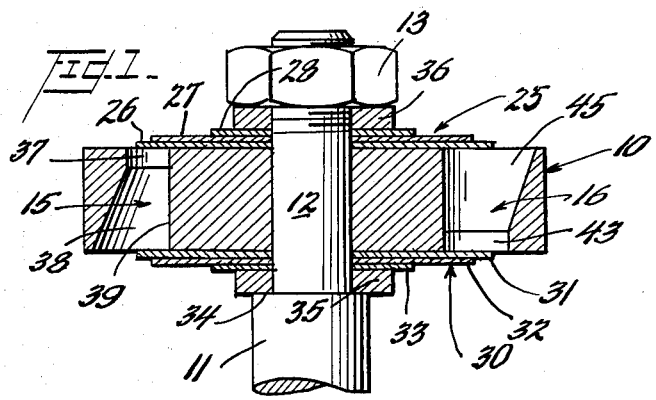
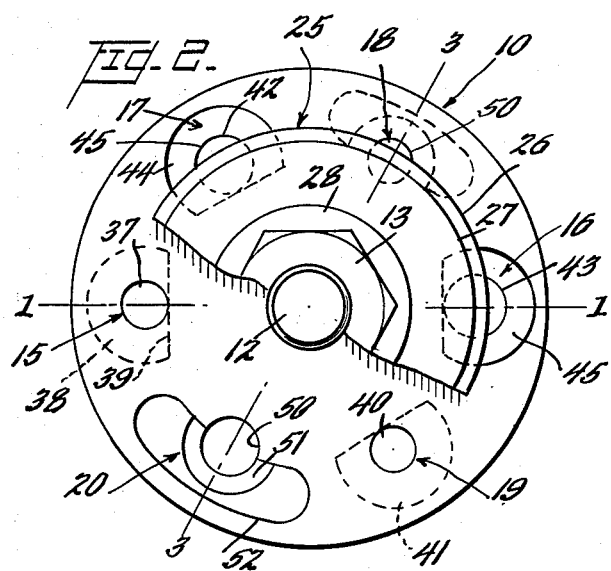
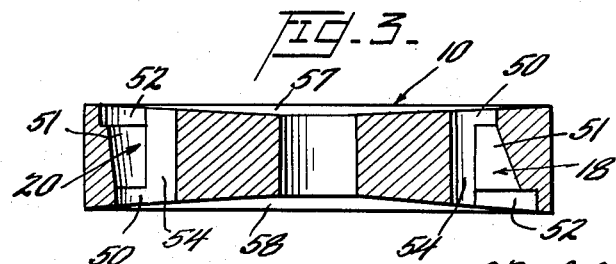
INVENTOR
C. M. L. L. Bourcier de Carbon
BY Watson, Cole, Grindle & Watson
ATTORNEYS

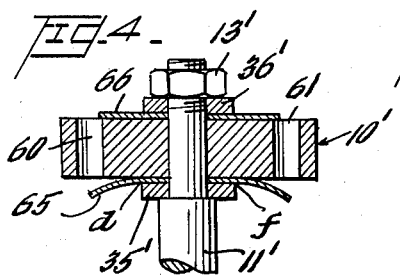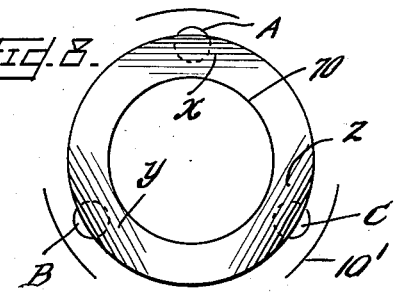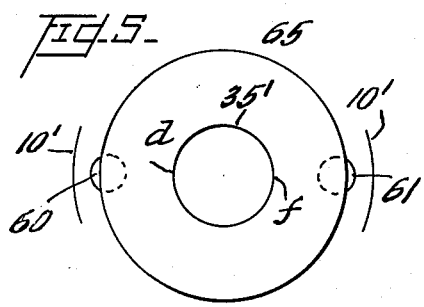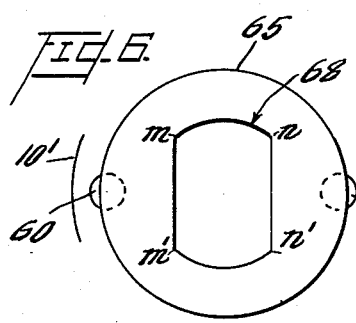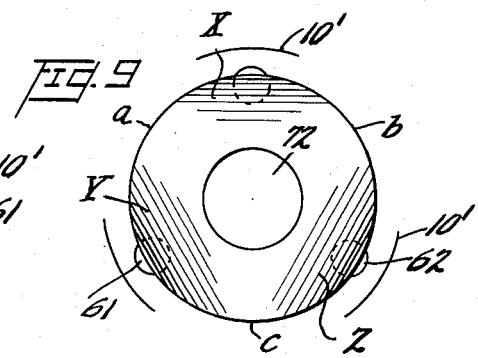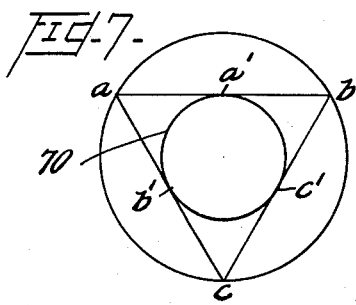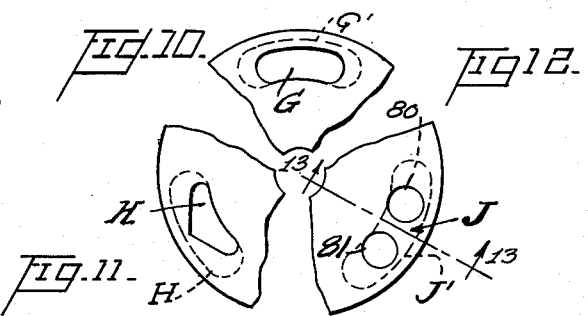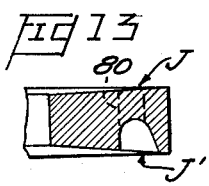
INVENTOR
C. M. L. L. Bourcier de Carbon
BY Watson, Cole, Grindle & Watson
ATTORNEYS

United States Patent Office 3,003,594
Patented Oct. 10, 1961

3,003,594
SHOCK ABSORBERS
Christian M. L. L. Bourcier de Carbon, 64 Blvd. Maurice-Barres, Neuilly-sur-Seine, France
Filed Dec. 9, 1957, Ser. No. 701,585
Claims priority, application France Nov. 4, 1957
15 Claims. (Cl. 188—88)

This invention relates to shock absorbers and more particularly to hydraulic direct acting shock absorbers employing pistons and cylinders and particularly adapted for damping the relative movements of automobile bodies and wheel suspensions.

The general object of the invention is to provide a novel and improved shock absorber of the class described which not only performs its function in an improved manner but with increased durability and reduced liability of breakage.

In my prior United States Patent No. 2,748,898 of June 5, 1956, there is described a piston assembly for use in a shock absorber, the body portion of which is provided with two systems of longitudinally extending passageways, one for the passage of the oil or other working medium from one side of the piston to the other during the expansion or rebound movement of the piston, and the other for the passage of the fluid medium during the compression movement of the piston; at least one of these systems of passageways being controlled by one or more flexible sheet metal valve discs, applied without initial stress, against the outlet orifices of the passageways, and arranged so as to permit passage of the fluid by deformation by simple cylindrical flexure, this being preferred over conical flexure which would impart to the flexible disc a conical or umbrella-shaped configuration and present various operation drawbacks.

In the same patent, there was described a preferred embodiment in which each of these systems of passageways is composed of two diametrically opposite passageways arranged symmetrically with respect to the axis of the piston, the plane through the expansion or rebound passageways being perpendicular to the plane passing through the compression passageways.

In my copending application Ser. No. 489,694, filed February 21, 1955, it was revealed that the pistons with internal passageways controlled by flexible valve discs could be improved in particular by the following arrangements: (1) the seats of the valve discs at the orifices of the passageways comprise lips of quite small width, for example from 0.3 to 1 millimeter, so as to decrease the viscous resistance to flow of the fluid medium which resistance has the disadvantage of varying with the temperature; (2) permanently open fluid passageways, which are therefore suitable for passage of fluid in either direction, are provided either outside of the two systems of passageways previously described, or preferably at the outlets of those passageways, for instance, by dimensioning the main valve disc, that is to say, the one which is in contact with the face of the piston, in such a way that when projected onto a plane perpendicular to the axis of the piston, it leaves uncovered a fractional portion of the orifices; (3) the valve consists of a stack of thin discs (preferably three) applied to the corresponding face of the piston by means of a rigid supporting washer of a diameter greater than that of the piston rod; (4) the valve discs constituting each valve assembly are of decreasing diameter, the disc of largest diameter being in contact with the face of the piston.

These four features not only have the purpose of improving the mode of operation of the piston, but they also serve to reduce fatigue in the valve discs, which fatigue would otherwise result either in a substantial decrease in the efficiency of the shock absorber after a certain period of use, or even in the fracture of the discs.

The problem of the structure and configuration to be imparted to the piston elements in order to restrict the fatigue set up in the valve discs to the smallest possible amount, is a very difficult one.

In order to limit the development of this fatigue, it has already been suggested in the application from which my Patent No. 2,748,498 issued, and the French Patent 1,020,109 from which it derives priority, not only to use the principle of cylindrical flexure by preference over conical flexure, but also to impart to the outlet orifices of the passageways a cross section having the form of elongated curved slots occupying an arc of a circle centered on the axis of the piston. One variant of this arrangement consists in substituting for the flattened curved orifice, a series of two, three, four, or more juxtaposed cylindrical passageways which, taken together, are the practical equivalent of a single flattened arcuate passageway. This basic idea has been carried over into and further developed in my co-pending application Ser. No. 489,694 and its divisionals Ser. No. 798,707 and Ser. No. 798,708.

With these basic background principles in mind, it may be stated that one of the principal objects of the invention is the solution of this problem of fatigue by providing, for each direction of flow of the working fluid through the piston, instead of a system of two diametrically opposed channels, a system of three channels arranged in the apices of the equilateral triangle centered on the axis of the piston.

Another object of the present invention is to develop certain dimensional information relating to the constituent parts of the pistons which use flexible valve discs as flow controlling elements. The applicant has discovered by numerous tests carried out on pistons of this type, as well as by a theoretical analysis of their operation, that it is possible to restrict within relatively narrow limits, the dimensions to be imparted to the constituent elements in order to obtain conditions for optimum operation.

These features of novelty are particularly applicable to situations where the passageways are so controlled as to be at least partially open when the valves are in repose upon the orifices at the appropriate surface of the piston.

A further object of the invention involves the impartation to the faces of the piston on which the principal valve discs come to rest, instead of an absolutely flat configuration as previously employed, a very slightly hollowed-out form, for instance, conical, the total height of the cone or depth of the hollowed-out portion rather, being very slight and of the order of approximately $\frac{1}{10}$ to $\frac{2}{10}$ of a millimeter. Further, the conical depression on which the compression valve discs rest, that is, the face of the piston located on the side from which the piston rod extends, will preferably be slightly more accentuated than the conical seat of the expansion or rebound valve discs, the ratio of depths of the depressions being advantageously about 2:1. This very slightly hollowed shape of the faces of the piston has the advantage of imparting to the valve discs a very slight initial tension or stress which assures them an excellent seating over the outlet orifices. However, the main reason for this arrangement is to assure a faster return of the flexible discs to their rest position, which is very important in order to avoid the transmission of small impacts at high frequencies, for instance, as when the vehicle equipped with these shock absorbers passes over a rough pavement, such as one composed of cobblestones. This provision, however, is not to be confused at all with the great degree of pre-loading of the operating valves of most shock absorbers now on the market.

Further objects and features of novelty will be apparent from the following specification when read in connection with the accompanying drawings in which certain embodiments of the invention are illustrated by way of example.

In the drawings:

FIGURE 1 is a view principally in vertical section on line 1—1 of FIGURE 2, showing a shock absorber piston embodying the principles of the present invention;

FIGURE 2 is a top plan view of the piston shown in FIGURE 1 with part of the valve broken away for purposes of clarity of illustration;

FIGURE 3 is a vertical sectional view through the bare piston shown in FIGURE 2 and taken on line 3—3 of that figure;

FIGURE 4 is a view similar to FIGURE 1 but of an extremely diagrammatic nature to illustrate certain points of flexure of the valves;

FIGURES 5–9 inclusive are diagrams, principally of piston and valving configurations and relationships, illustrating various expedients coming within the purview of the present invention;

FIGURES 10–12 inclusive are fragmentary plan views of piston surfaces illustrating modifications of the orifice arrangements of the various passageways; and FIGURE 13 is a fragmentary vertical sectional view taken on line 13—13 of FIGURE 12.

In FIGURE 1 and the figures related thereto, the piston is given the general designation 10 and is carried upon the end of a piston rod 11, the attenuated terminal portion of which is indicated at 12, this portion being threaded for the reception of the nut 13.

The piston 10, in these immediate figures, is provided with passageways for the transmission of working fluid during the reciprocation of the piston, these passageways being of various configurations and dimensions, as will be presently described. In FIGURE 1, one of the passageways serving to control the bypassing of the working fluid during a rebound or expansion stroke of the piston is indicated at 15 and a somewhat larger, but similarly shaped, passageway for transmission of and control of fluid flow during the compression stroke is indicated at 16.

For controlling the flow through the rebound passageway 15 a valve assembly 25 is employed. This consists of the principal or basic valve disc 26 and two superposed narrower discs 27 and 28.

For controlling the flow through the compression passageway 16, a valve assembly 30 is employed which consists of the bottom valve disc 31 and the successively narrower discs 32 and 33.

Between the valve assembly 30 and the shoulder 34 of the piston rod 11 there is disposed a washer 35 and between the upper valve assembly 25 and the nut 13 there is interposed a washer 36.

Referring now more particularly to FIGURE 2 of the drawings, but with explanatory references to FIGURES 1 and 3; it may be stated that there are other passageways passing through the piston for accommodating flow in different directions and these passageways are given the general designations 17, 18, 19 and 20. For purposes of illustration of the various conceptions of passageway configurations embraced within the scope of the present invention, these passageways adopt various forms; and it is understood that the piston may include passageways all of which have the same configuration, or any various combinations of passageways for affording differences in flow in the two directions, may be chosen in accordance with the particular use to which the shock absorber is to be put.

Passageways 15, 18, and 19 are suitably controlled by the valve assembly 25 during rebound movement of the piston, and passageways 16, 17, and 20 are regulated by valve assembly 30 during compression movement of the piston.

Passageways 15, 16, 17, and 19 are quite similar in configuration and each comprises a somewhat cylindrical orifice portion and a flared or tapered principal portion extending from the orifice portion to the opposite side of the piston. Specifically, the passageway 15 comprises the cylindrical neck or orifice portion 37 and the flared portion 38 which is principally conical but has a flattened inner side 39. Similarly, passageway 19 has a small cylindrical orifice section 40, and a flared and flattened principal section 41.

The other pair of similar passageways 17 and 16 is in inverted relationship to 15 and 19 but is provided with cylindrical orifice portions 42 and 43 respectively and flared and flattened portions 44 and 45 respectively.

This leaves the remaining passageways 18 and 20 to be described. These passageways open through opposite faces of the piston and each includes a narrow cylindrical orifice portion 50, an intermediate flared semi-annular portion 51 and an arcuate oval-shaped orifice portion at the opposite side of the piston, which is designated 52. It will be seen that the smaller cylindrical configuration of the orifice 50 in each case is extended all the way through the piston and which results in a semi-cylindrical wall 54 which intersects the opposite orifice 52.

It will be seen that the outer disc 26 of the valve assembly 25 is of insufficient diameter to completely cover the control orifices 37, 40, and 50 respectively of the valve passageways 15, 18, and 19, leaving a substantially crescent-shaped permanent opening as shown at 55 in connection with passageways 16 and 17. Similarly, upon the underside of the piston the largest disc 31 of the valve assembly 30 incompletely covers the orifices 42, 43, and 45 of the passageways 16, 17, and 20 of the compression series leaving similar crescent-shaped openings 55.

By preference, the upper and lower faces of the piston body 10 are respectively dished out conically as indicated at 57 and 58 in FIGURE 3, the depth of the depression 58 being somewhat greater than that of the depression 57.

A study of the fatigue phenomenon of the valve discs in the case of two diametrically opposite passageways shows that the maximum fatigue points are the points $d$ and $f$ which are in contact with the supporting washer 35 as indicated in FIGURES 4 and 5 where a diagrammatic showing of a piston occurs, this piston being designated 10′ and being carried upon a piston rod 11″. Passageways 60 and 61 are shown as presenting diagrammatically the compression passageways of the piston which are controlled by the valve disc or leaf 65; the opposite passageways (not shown) are controlled by the valve leaf 66, a washer 36′ being interposed between that valve disc and the nut 13′.

At the two points $d$ and $f$, there is localized an important concentration of stresses which might have the result of local plastic deformations resulting in a decrease of the efficiency of the shock absorber. One method of decreasing this concentration of stresses at $d$ and $f$ might consist of employing, instead of a circular supporting washer as indicated at 35′, a small substantially rectangular supporting block or else an initially circular supporting washer (as shown at 68 in FIGURE 6) with its side portions cut away along two straight parallel lines $mm'$ and $nn'$. The region of maximum fatigue is then distributed along the entire length of the lines $mm'$ and $nn'$ and the maximum stress involved is thus decreased.

However, a better solution for this difficulty can be found and this constitutes the principal object of the present invention, which has already been stated, namely, the use of a system of three passageways arranged in the apices of an equilateral triangle, as for example, as shown in FIGURES 1 and 2 of the drawings.

First of all, it is obvious that if the supporting washer 70 is of a diameter greater than that of the circle $a'$, $b'$, $c'$ (FIGURE 7) inscribed in the equilateral triangle $a$, $b$, $c$, which in turn is inscribed within the main valve disc, that is to say, the washer being of a diameter greater than one-half the diameter of the main valve disc, the flexure of the latter under the pressure of the fluid medium emerging from the three orifices diagrammatically indicated at A, B and C in FIGURE 8, takes place in three regions which have no point in common, these regions being indicated by the hatched shading areas $x$, $y$ and $z$. The deformation in any one of these regions has no effect on the deformation in the other two, and it is easy to see that the deformation in each case is then necessarily cylindrical and not conical, that is to say, of the type which is recommended in my Patent No. 2,748,898.

However, experience reveals one unexpected and particularly interesting fact, namely, that in the case of the triangular distribution of the passageways, even when the valve discs employed are circular, the deformation is still cylindrical when the supporting washer is of a diameter somewhat less than half that of the main valve disc. This, of course, stems from the fact that the actual crease or bend line of the disc is not a sharp line exactly tangent to the rim of the clamping washer but a gentle curve; the actual effective flexure beginning to be operatively perceptible at approximately the radial inward limits of the shading shown in the diagrammatic FIGURE 9. This is especially true in the situation where there are employed two or more stacked discs as in the practical embodiment shown in FIGURES 1 and 2. These non-intersecting geometric chordal lines denoting the beginnings of flexure subtend the mutually exclusive segments of the disc, beneath which respective segments the three equally spaced outlet orifices or groups of orifices lie. It results from this that the deformation of the main valve disc is then limited to the three zones X, Y and Z shown in the diagrammatic FIGURE 9, the entire region within the equilateral triangle $a$, $b$, $c$ (similar to the one shown in the diagram of FIGURE 7) being therefore removed from the effect of flexure and remaining flat, this eliminating for all practical purposes the localizing and concentrating of the maximum stresses at the particular points in contact with the supporting washer. Finally, there results from this much less fatigue on the valve discs and this has considerable advantages from the functional viewpoint, making it possible to reduce the number of valve discs necessary to use on each face of the piston to two and even in certain cases to only one.

The foregoing development is of course somewhat schematic and approximate; thus, for instance, the central supporting washer, for example 72 in FIGURE 9, should not be too small a diameter since in such a case there would be a new concentration of stresses at the apices $a$, $b$, and $c$ which would cause the device to lose some of its advantages.

Taking all of these factors into consideration, it is believed that it is most advisable to use a supporting washer of a diameter only slightly less than one-half the diameter of the main valve disc, for example, from about 38% to just short of 50% of the diameter of the main valve disc.

As compared with the arrangement of two diametrically opposite passageways shown schematically in FIGURE 5, the triangular arrangement recommended in connection with the present invention has also another very substantial advantage, namely, that it makes the adjustment practically independent of the orientation of the valve discs, while this is by no means true in the case of distribution in connection with the provision of two diametrically opposite passageways. The spring steel valve discs present, as a matter of fact, a structural anisotropism resulting from their passage through the rolling mill, and a different coefficient of elasticity prevails in the direction of fibers produced by the rolling process as opposed to the direction perpendicular thereto. The adjustment of the shock absorber is particularly sensitive to this in the case of distribution of two diametrically opposite passageways, while in the case of triangular distribution a compensation takes place which makes the adjustment practically insensitive to the orientation of the valve disc.

Now in connection with one of the previously asserted principal objects of the invention, it may be stated that, first of all, in the case of triangular distribution of passageways, the optimum diameter of the outlet orifice of each of the three expansion or rebound passageways is between 6% and 12% of the diameter of the piston, while the optimum diameter of the outlet orifice of each of the three compression passageways is between 9% and 18% of the diameter of the piston. It is desirable that the outlet orifices of the rebound passageways have a diameter less than that of the compression passageways, the ratio of the two diameters being preferably between 0.50 and 0.75. If the outlet orifices are not of circular shape, it is recommended to use the diameters of circles of equivalent cross-section in the calculations.

In order to avoid making the outlet orifices of the compression passageways of too large a diameter, which would have several drawbacks, the one particularly advantageous solution consists of providing configurations such as suggested in FIGURES 10–12 of the drawings. These include the imparting to the orifices of either the elongated oval arcuate configuration G of FIGURE 10 or the equivalent of some triangular shape H, as in FIGURE 11, or else preferably the arrangement J of FIGURE 12 wherein are provided two or three adjacent circular orifices 80 and 81 giving the circularly elongated effect of the single orifices G and H. The inlet orifices of the passageways in FIGURES 10, 11 and 12 are designated by dotted lines in somewhat similar fashion to the delineation in FIGURE 2 with respect to the orifices 52, and these orifices at the remote side of the several piston fragments are designated respectively G', H' and J'.

The optimum thickness of the valve discs used for controlling the expansion or rebound orifices varies from 0.30 to 0.60 millimeter. That of the compression disc varies from 0.20 to 0.40 millimeter. The latter may be as thin as 0.15 millimeter if there is desired a shock absorber of very low resistance to compression forces. The valve discs which control the compression passageways must be thinner than those of the expansion passageways.

The optimum diameter of the main valve disc used in controlling the compression passageways will be between 75% and 90% of that of the piston. The optimum diameter of the main rebound disc will be between the same limits or preferably slightly less than that of the corresponding main compression disc.

These optimum figures are valid even if there is concerned a distribution of the orifices other than a triangular distribution. With respect to the dimension of the orifices, it is then advisable to use for all the rebound passageways and for all the compression passageways an equivalent total section.

Now as to the matter of permitting a portion of the passageway orifices to remain permanently open, by having the perimeter of the valve disc come short of completely covering the passageways, the present applicant has discovered that the optimum dimension of the permanent passageways is subject to the following rule. The sole circle equivalent to the sum total of the permanent passageways intentionally provided to cause the regions disposed on either side of the piston to communicate with each other, has a diameter between $\frac{1}{20}$ and $\frac{1}{10}$ of that of the piston of the shock absorber. It is to be pointed out that the functional clearance between the piston and the cylinder walls necessary for mechanical sliding, is not to be counted in calculating these intentional permanent passageways. The laws of flow in this laminar space are very different from the passageways under discussion. However, if longitudinal grooves were provided on the outer wall of the piston, the cross section of such grooves would have to be counted as permanent passageways.

These permanently open passageways will preferably be localized between the margins of the main compression or the rebound valve discs and the respective outlet orifices which it controls. However, and more advantageously, they will be distributed on the one hand between the main compression disc and the outlet orifices which it controls, and on the other hand between the main expansion or rebound disc and the outlet orifices which it controls.

In the latter case, the most important portion (for example, ¾ or even more) will preferably be localized between the main compression disc and the outlet orifices which it controls. This rule gives an optimum distribution on the one hand for the quality of the ride and on the other hand in order to limit as far as possible variations in the effect of the shock absorber resulting from variations in the viscosity of the oil due to temperature changes.

These permanent passageways will preferably be made by giving the main valve disc a diameter insufficient to cover entirely the outlet orifice of the passageways which it controls. This technique is of great advantage for it makes it possible to use, for shock absorbers of different dimensions, one and the same piston body without any machining, whatever the adjustment to be effected. On the other hand, it makes it possible by means of a single range of valve discs of diameters which increase suitably as a function of their thickness, automatically to product the optimum permanent opening or passageway corresponding to the adjustment to be effected. There results from this a great simplification for the determination of the optimum adjustments and also for facilitating the manufacture of different shock absorbers corresponding to the different cars.

This technique of effecting incomplete coverage of the orifices has still another considerable advantage. It makes the viscous resistance to the discharge of the working liquid on the part of the most important outlet orifice, practically zero. It is at this point which is furthest from the axis of the piston that the valve disc assumes the greatest bend. This results in a much reduced sensitivity of the shock absorber to thermal variations, which also permits still another simplification in the design of the piston.

Thus, as a matter of fact, it becomes much less important to provide valve seats around the orifices which are of very small width and designed like the edges of a crater, as was recommended in the case of the shock absorber featuring my application Ser. No. 489,694; the outlet orifices can therefore without disadvantage consist of a simple hole drilled in the flat face of the piston, which simplifies the piston design in accordance with the suggestions set forth diagrammatically in FIGURES 1, 2 and 3 of the present drawings. The double circulation of the fluid through the two systems of expansion and compression passageways can be solved by imparting to the inlets of the channels or passageways either the funnel shape suggested at 38 in the case of passageway 15 or the equivalent configuration 51, 52 as applied to the passageway 20. It will be noted that in the latter configuration given to passageways 18 and 20, the inlet orifice is in the form of an elongated circular arc which facilitates the feeding of the passageway.

As between the choice of two different thicknesses of disc, intermediate selections can be made by adjustments of the diameter of the supporting washer, which also makes it possible to limit the number of discs to be used.

The last general object of the invention stated briefly above, refers to the hollowing-out of the upper and lower surfaces of the piston by providing conical depressions therein which, as stated, has the effect of imparting to the foil sheets a very slight initial tension which in turn assures a quicker return of the sheets to their rest position.

The depression for the accommodation of the valve member 25 which comprises the discs 26, 27, and 28, is shown in FIGURE 3 at 57, and the lower depression which accommodates valve 30 including the discs 31, 32, and 33, is designated at 58 in the same figure. Preferably, the cavity 58 will be somewhat deeper than the cavity 57, the ratio being advantageously approximately 2:1.

Various changes and modifications may be made in the embodiments illustrated and described herein without departing from the scope of the invention as determined by the subjoined claims.

Having thus described the invention, what is claimed as new and desired to be secured by Letters Patent is:

1. In a double-acting fluid damped telescoping shock absorber for operative connection between two members to cushion the relative movements of said members toward and away from each other, whereby the movement of the members toward each other results in a compression movement of the telescoping shock absorber parts and the movement of the members apart results in an expansion or rebound movement of the parts, the combination of: a cylindrical casing containing a damping fluid, a piston disposed in said casing for reciprocation within the body of damping fluid upon the occurrence of compression or rebound movements, and a piston rod having one end fixed to said piston and extending axially through the casing; passageways extending through said piston in the longitudinal direction through which the fluid may pass from one side of the piston to the other during reciprocation thereof, and at least one thin flexible valve disc fixedly secured centrally to each end of the piston for controlling and regulating the flow of damping fluid through the passageways in the respective directions; certain of said passageways serving primarily to transmit fluid from the rebound side of the piston to the compression side thereof upon the occurrence of rebound movement, one of said valve discs overlying and controlling the outlet orifices of said rebound passageways at the compression face of the piston; and others of said passageways serving primarily to transmit fluid from the compression side of the piston to the rebound side thereof upon the occurrence of compression movement, the other one of said valve discs overlying and controlling the outlet orifices of said other passageways at the rebound face of the piston, the bore of each of the passageways, however, being of a generally funnel-like divergent configuration flaring from at least one smaller controlled outlet orifice adjacent the respective valve disc overlying and controlling the same to a larger inlet orifice at the opposite face of the piston where said larger inlet orifice is overlaid by the other valve disc only partially, the radial inward wall of each passageway, however, having no inward inclination, the inclining flare of the contour of the passageways being outward and circumferential only, whereby a lateral component is given the flow of fluid through said passageways during operation, the resulting segmental uncovered portion of the inlet orifice being of an area at least as large as the maximum opening of the outlet orifice of the passageway permitted by its controlling valve disc.

2. In a double-acting fluid damped telescoping shock absorber for operative connection between two members to cushion the relative movements of said members toward and away from each other, whereby the movement of the members toward each other results in a compression movement of the telescoping shock absorber parts and the movement of the members apart results in an expansion or rebound movement of the parts, the combination of: a cylindrical casing containing a damping fluid, a piston disposed in said casing for reciprocation within the body of damping fluid upon the occurrence of compression or rebound movements, and a piston rod having one end fixed to said piston and extending axially through the casing; passageways extending through said piston in the longitudinal direction through which the fluid may pass from one side of the piston to the other during reciprocation thereof, and at least one thin flexible valve disc fixedly secured centrally to each end of the piston for controlling and regulating the flow of damping fluid through the passageways in the respective directions; certain of said passageways serving primarily to transmit fluid from the rebound side of the piston to the compression side thereof upon the occurrence of rebound movement, one of said valve discs overlying and controlling the outlet orifices of said rebound passageways at the compression face of the piston; and others of said passageways serving primarily to transmit fluid from the compression side of the piston to the rebound side thereof upon the occurrence of compression movement, the other one of said valve discs overlying and controlling the outlet orifices of said other passageways at the rebound face of the piston, the bore of each of the passageways, however, being of a generally funnel-like divergent configuration flaring from at least one smaller controlled outlet orifice adjacent the respective valve disc overlying and controlling the same to a larger inlet orifice at the opposite face of the piston where said larger inlet orifice is overlaid by the other valve disc only partially, the resulting segmental uncovered portion of the inlet orifice being of an area at least as large as the maximum opening of the outlet orifice of the passageway permitted by its controlling valve disc, and the respective diameters of the flexible valve discs on both sides of the piston being less than the diameter of a circle tangent to the outer margins of the outlet orifices which the respective discs control, whereby a permanently open segmental crescent-like aperture is established in the case of the controlled outlet orifice as well as in the case of the aforesaid inlet orifices, but of considerably less cross-sectional area.

3. The shock absorber as set forth in claim 2 in which the total area of the permanently open segmental passages of the outlet orifices of the passageways, is equivalent to the area of a circle whose diameter is approximately from $\frac{1}{10}$ to $\frac{1}{20}$ of that of the piston.

4. In a double-acting fluid damped telescoping shock absorber for operative connection between two members to cushion the relative movements of said members toward and away from each other, whereby the movement of the members toward each other results in a compression movement of the telescoping shock absorber parts and the movement of the members apart results in an expansion or rebound movement of the parts, the combination of: a cylindrical casing containing a damping fluid, a piston disposed in said casing for reciprocation within the body of damping fluid upon the occurrence of compression or rebound movements, and a piston rod having one end fixed to said piston and extending axially through the casing; passageways extending through said piston in the longitudinal direction through which the fluid may pass from one side of the piston to the other during reciprocation thereof, and at least one thin flexible valve disc fixedly secured centrally to each end of the piston for controlling and regulating the flow of damping fluid through the passageways in the respective directions; certain of said passageways serving primarily to transmit fluid from the rebound side of the piston to the compression side thereof upon the occurrence of rebound movement, one of said valve discs overlying and controlling the outlet orifices of said rebound passageways at the compression face of the piston; and others of said passageways serving primarily to transmit fluid from the compression side of the piston to the rebound side thereof upon the occurrence of compression movement, the other one of said valve discs overlying and controlling the outlet orifices of said other passageways at the rebound face of the piston, the bore of each of the passageways, however, being of a generally funnel-like divergent configuration flaring from at least one smaller controlled outlet orifice adjacent the respective valve discs overlying and controlling the same to a larger inlet orifice at the opposite face of the piston where said larger inlet orifice is overlaid by the other valve disc only partially, the resulting segmental uncovered portion of the inlet orifice being of an area at least as large as the maximum opening of the outlet orifice of the passageway permitted by its controlling valve disc, the respective inlet orifices being formed by relatively large arcuate slots let into the respective faces of the piston, and with which the controlled outlet portions of the passageways passing through the piston merge.

5. In a double-acting fluid damped telescoping shock absorber for operative connection between two members to cushion the relative movements of said members toward and away from each other, whereby the movement of the members toward each other results in a compression movement of the telescoping shock absorber parts and the movement of the members apart results in an expansion or rebound movement of the parts, the combination of: a cylindrical casing containing a damping fluid, a piston disposed in said casing for reciprocation within the body of damping fluid upon the occurrence of compression or rebound movements, and a piston rod having one end fixed to said piston and extending axially through the casing; passageways extending through said piston in a longitudinal direction through which the fluid may pass from one side of the piston to the other during reciprocation thereof, and at least one thin flexible valve disc fixedly secured centrally to each end of the piston for controlling and regulating the flow of damping fluid through the passageways in the respective directions; certain of said passageways serving primarily to transmit fluid from the rebound side of the piston to the compression side thereof upon the occurrence of rebound movement, one of said valve discs overlying and controlling the outlet orifices of said rebound passageways at the compression face of the piston; and others of said passageways serving primarily to transmit fluid from the compression side of the piston to the rebound side thereof upon the occurrence of compression movement, the other one of said valve discs overlying and controlling the outlet orifices of said other passageways at the rebound face of the piston, the bore of each of the passageways, however, being of a generally funnel-like divergent configuration flaring from at least one smaller controlled outlet orifice adjacent the respective valve discs overlying and controlling the same to a larger inlet orifice at the opposite face of the piston where said larger inlet orifice is overlaid by the other valve disc only partially, the resulting segmental uncovered portion of the inlet orifice being of an area at least as large as the maximum opening of the outlet of the passageway permitted by its controlling valve disc, there being six passageways through the piston, namely, three compression and three rebound passageways, three passageways of each of said groups being disposed 120° apart as at the apices of an equilateral triangle centered on the axis of the piston, each valve disc being circular, and a circular clamping washer bearing directly upon each flexible valve disc, the diameter of each of said washers being such that three lines indicating the radially innermost limits of substantial flexure of the discs and extending the segments of the discs which respectively overlie the three equally spaced outlets on the same face of the piston will not intersect within the confines of the valve disc, and thus the disc will flex cylindrically along three marginal mutually exclusive areas thereby reducing the fatigue to which the discs are subjected during use and also equalizing and distributing the directional effect of any anisotropism of the material of which the discs are made.

6. In a double-acting fluid damped telescoping shock absorber for operative connection between two members to cushion the relative movements of said members toward and away from each other, whereby the movement of the members toward each other results in a compression movement of the telescoping shock absorber parts and the movement of the members apart results in an expansion or rebound movement of the parts, the combination of: a cylindrical casing containing a damping fluid, a piston disposed in said casing for reciprocation within the body of damping fluid upon the occurrence of compression or rebound movements, and a piston rod having one end fixed to said piston and extending axially through the casing; passageways extending through said piston in the longitudinal direction through which the fluid may pass from one side of the piston to the other during reciprocation thereof; and at least one thin flexible valve disc secured centrally to each end of the piston for controlling and regulating the flow of damping fluid through the passageways in the respective directions, certain of said passageways serving primarily to transmit fluid from the rebound side of the piston to the compression side thereof upon the occurrence of rebound movement, one of said valve discs overlying and controlling the outlet orifices of said rebound passageways at the compression fact of the piston, and others of said passageways serving primarily to transmit fluid from the compression side of the piston to the rebound side thereof upon the occurrence of compression movement, the other one of said valve discs overlying and controlling the outlet orifices of said other passageways at the rebound face of the piston, there being six passageways through the piston, namely three compression and three rebound passageways, three passageways of each of said named groups being disposed 120° apart as at the apices of an equilateral triangle centered on the axis of the piston, each valve disc being circular, and a circular clamping washer bearing directly upon each flexible valve disc, the diameter of each of said washers being such that three lines indicating the radially innermost limits of substantial flexure of the discs and subtending the segments of the discs which respectively overlie the three equally spaced outlets on the same face of the piston will not intersect within the confines of the valve disc, and thus the disc will flex cylindrically along three marginal mutually exclusive areas thereby reducing the fatigue to which the discs are subjected during use and also equalizing and distributing the directional effect of any anisotropism of the material of which the discs are made.

7. The shock absorber as set forth in claim 6 in which the diameters of the circular clamping washers are one-half of the diameter of the valve discs.

8. The shock absorber as set forth in claim 6 in which the diameters of the circular clamping washers are from about 38% to about 50% of the diameters of the valve discs.

9. The shock absorber as set forth in claim 6 in which the diameters of the valve discs are from about 75% to about 90% of that of the piston.

10. The shock absorber as set forth in claim 6 in which the diameters of the outlet orifices of the passageways are from 6% to 18% of that of the piston.

11. The shock absorber as set forth in claim 6 in which the diameters of the compression passageway outlet orifices are from 9% to 18% of those of the diameter of the piston and the diameters of the rebound passageway outlet orifices are from 6% to 12% of that of the piston, and the ratio of the diameters of the rebound orifices to those of the compression orifices is approximately from 0.50 to 0.75.

12. The shock absorber as set forth in claim 6 in which the compression valve disc is of a thickness of approximately 0.30 millimeter to 0.60 millimeter, and that of the rebound disc is approximately 0.15 millimeter to 0.40 millimeter.

13. The shock absorber as set forth in claim 6 in which both faces of the piston with which the valve disc contacts are slightly concaved, to the approximate depth of from $1/10$ millimeter to $2/10$ millimeter.

14. The shock absorber as set forth in claim 13 in which the depth of the concavity on the piston rod side of the piston, that is the side upon which the compression controlling valve disc is fixed, is approximately twice that of the concavity on the opposite side of the piston.

15. The shock absorber combination set forth in claim 6 in which at least one set of passageways having outlets on the same side of said piston comprise forked passageways having single large inlet orifices and outlets comprising twin orifices.

References Cited in the file of this patent

UNITED STATES PATENTS

| | | |
|---|---|---|
| Re. 23,421 | Whisler | Oct. 16, 1951 |
| 1,866,167 | Lolley | July 5, 1932 |
| 2,676,676 | Strauss et al. | Apr. 27, 1954 |
| 2,811,226 | Allinguant | Oct. 29, 1957 |
| 2,828,836 | Kamman | Apr. 1, 1958 |

FOREIGN PATENTS

| | | |
|---|---|---|
| 1,080,670 | France | June 2, 1954 |
| 66,566 | France | Dec. 3, 1956 |
| | (2nd addition to No. 934,622) | |
| 688,885 | Great Britain | Mar. 18, 1953 |